United States Patent
Naganuma

(10) Patent No.: US 8,782,517 B2
(45) Date of Patent: Jul. 15, 2014

(54) DOCUMENT MANAGEMENT SYSTEM AND DOCUMENT MANAGEMENT METHOD WHICH ENABLES A DOCUMENT OPERATION USING A SHORT CUT TEMPLATE

(75) Inventor: Tadashi Naganuma, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 410 days.

(21) Appl. No.: 12/405,825

(22) Filed: Mar. 17, 2009

(65) Prior Publication Data

US 2009/0241021 A1 Sep. 24, 2009

(30) Foreign Application Priority Data

Mar. 18, 2008 (JP) .................................. 2008-070166

(51) Int. Cl.
- G06N 5/02 (2006.01)
- G06F 17/30 (2006.01)
- G06F 17/24 (2006.01)
- G06Q 10/10 (2012.01)

(52) U.S. Cl.
CPC ........ *G06F 17/30011* (2013.01); *G06F 17/248* (2013.01); *G06Q 10/10* (2013.01)
USPC .............................. 715/255; 715/810; 715/825

(58) Field of Classification Search
CPC .................................................. G06F 17/30011
USPC .......................................... 715/255, 810, 825
See application file for complete search history.

(56) References Cited

U.S. PATENT DOCUMENTS

| | | | |
|---|---|---|---|
| 7,555,713 B2* | 6/2009 | Yang .............................. | 715/248 |
| 7,761,471 B1* | 7/2010 | Lee et al. ...................... | 707/783 |
| 7,809,667 B1* | 10/2010 | Yehuda et al. ................. | 706/47 |
| 7,827,195 B2* | 11/2010 | Uematsu et al. .............. | 707/784 |
| 2001/0039594 A1* | 11/2001 | Park et al. ...................... | 709/311 |
| 2004/0215671 A1* | 10/2004 | Hyakutake et al. ........... | 707/203 |
| 2006/0059415 A1* | 3/2006 | Hagiuda ........................ | 715/500 |
| 2006/0074793 A1* | 4/2006 | Hibbert et al. ................. | 705/38 |
| 2006/0195778 A1* | 8/2006 | Bendik ......................... | 715/500 |
| 2007/0101259 A1* | 5/2007 | Grigoriadis et al. .......... | 715/517 |
| 2008/0104511 A1* | 5/2008 | Chinnadurai et al. ........ | 715/703 |
| 2008/0115104 A1* | 5/2008 | Quinn ........................... | 717/101 |
| 2008/0144881 A1* | 6/2008 | Fortune et al. ................ | 382/100 |
| 2008/0147790 A1* | 6/2008 | Malaney et al. .............. | 709/203 |
| 2008/0235261 A1* | 9/2008 | Malek et al. .................. | 707/102 |
| 2011/0179344 A1* | 7/2011 | Paxson ......................... | 715/205 |

FOREIGN PATENT DOCUMENTS

JP 09-251416 A 9/1997

* cited by examiner

*Primary Examiner* — William Bashore
*Assistant Examiner* — Nathan Shrewsbury
(74) *Attorney, Agent, or Firm* — Carter, DeLuca, Farrell & Schmidt, LLP

(57) ABSTRACT

A client device network-connected to a document management server managing a document stored in a storage and keeping at least one document managing rule, firstly edits a template which includes information for an operation performed to a document, information for a name of a menu to be registered in the device, and an identifier of a document managing rule. Then, a document managing rule specified by the identifier which is included in the edited template is obtained from the server. Then, a determination is made as to whether or not an operation which is included in the edited template is pursuant to the obtained document managing rule. Finally, a name of a menu instructing to perform the operation in the client device is registered, if it is determined that the operation included in the edited template is pursuant to the obtained document managing rule, and is not registered otherwise.

7 Claims, 11 Drawing Sheets

MENU/COMMAND STORAGE

| ID | MENU | COMMAND | PATH | RULE |
|---|---|---|---|---|
| 1 | OPEN DOCUMENT | VIEW | | |
| 2 | REGISTER DOCUMENT | REGISTER | | |
| 3 | SEARCH DOCUMENT | SEARCH | | |
| 4 | EXPORT TEMPLATE | EXPORT TEMPLATE | | |
| 5 | REGISTER MENU | REGISTER | | |
| 6 | EXPORT MENU | EXPORT MENU | | |
| M1 | VIEW SCHEDULE | VIEW | ¥¥Cabinet¥Doc | 1,3 |
| M2 | REGISTER SCHEDULE | REGISTER | ¥¥Cabinet¥Doc | 1,2,5,7 |

RULE STORAGE

| | CONDITION | LIMITATION |
|---|---|---|
| 1 | SIZE | 2MB |
| 2 | PATH | YY |
| 3 | FILE NAME | 20Byte |
| 4 | TYPE | doc, xls, ppt, pdf |

FIG.4

TEMPLATE FILE

| CABINET NAME | DMSV DEVELOPMENT | |
|---|---|---|
| PATH | ¥¥DMS¥DMSV DEVELOPMENT¥ Doc | |
| DOCUMENT NAME | DEVELOPMENT SCHEDULE TABLE | |
| INDEX 1 | SCHEDULE TABLE | |
| INDEX 2 | DMSV DEVELOPMENT | |
| OPERATION1 | REGISTRATION | |
| OPERATION2 | VIEW | |
| OBJECT | SCHEDULE | |
| RULE | 1,2,4 | |
| | | |
| | | |

OUTPUT BATCH FILE

| CABINET NAME | DMSV DEVELOPMENT |
|---|---|
| PATH | ¥¥DMS¥DMSV DEVELOPMENT¥Doc |
| URL | Http://TOKKYOCHOH-123/123/document |
| DOCUMENT NAME | V DEVELOPMENT SCHEDULE TABLE |
| INDEX 1 | SCHEDULE TABLE |
| INDEX 2 | DMSV DEVELOPMENT |
| OPERATION1 | REGISTRATION |
| OPERATION2 | VIEW |
| OBJECT | SCHEDULE |
| RULE | 1,2,4 |
| BATCH FILE EXECUTION PROGRAM | |

FIG.6

DOCUMENT MANAGEMENT SYSTEM AND DOCUMENT MANAGEMENT METHOD WHICH ENABLES A DOCUMENT OPERATION USING A SHORT CUT TEMPLATE

BACKGROUND OF THE INVENTION

1. Field of the Invention

The present invention relates to a technology that easily registers a desired document and manages viewing the document in a document management system for accumulating and managing various documents, which improves an operability of a document registration by customizing menus and commands viewed on a user interface upon performing a registration operation of a document.

2. Description of the Related Art

It is becoming essential that information in the world is provided in the form of electronic data with development of infrastructure of the Internet or the like. When the information is provided in a form of electronic data, quick information transmission is possible provided that the infrastructure is equipped.

In addition, since electronic data are advantageous in search properties, it is possible to acquire desired information from a great deal of the accumulated information in a short time. In consequence, it is recently becoming a requisite condition that the information is configured of the form of electronic data.

Further, a document management system or a file server which manages electronic data can accumulate a great deal of information in a saving space. In addition, the infrastructure which transmits information at high speeds and has no limitation to connection locations is widely available and therefore, the document management system or the file sever is becoming equipped with search capabilities for acquiring desired information from a great deal of the accumulated information.

Since various types of information such as images, video images and the like are stored in the document management system, the document management system raises the problem that a user is required to select a search method in accordance with the type of the information at management or search processing of the document. For solving this problem, it is general to use the technology of providing a uniform access method by centralization management at the database (refer to Japanese Patent Laid-Open No. H09-251416 (1997)). With the advancement of these technologies, the document management system or the file server is generally and widely used as an effective system for information sharing in many companies, projects, education sites, families and the like.

The reason for wide use thereof is that many users can accumulate various kinds of information in the document management system without time limitation to unify the management of the information, carry out a search for desired information from the document management system when necessary, and share that information. However, the data can not be necessarily managed efficiently even if the document management system is introduced.

An electronic data has advantages that it does not need a physical storage location as in the case of papers, is easily handled and is easily edited. On the contrary, because of easiness of data handling, a great deal of data is easily accumulated in a document management system, and therefore, similar but different documents are stored in plenty therein. In consequence, there are considerable cases where at the time of searching for desired information, that information can not be distinguished.

Therefore, even if a management target is used in the form of electronic data, a use rule is needed in the document management system for managing documents. Such a use rule may be in advance determined between users, but since the user can arbitrarily determine it, there are many cases where that rule is not kept. The document management tends to be easily out of control. In addition, in a case where the management rule does not exist from the beginning, a user quite often changes or transfers document names by preference, possibly resulting in the difficulty of searching a target document.

The method of arbitrarily entrusting a user with a document management can be established on precondition that all of users observe its rule, but it is actually difficult to determine an optimal rule suitable for each actual use way of various kinds of users and force the users to completely keep them.

Further, a rigid or inelastic rule is not suitable for use ways of various users, but on the contrary, when a rule is detailed too much, it is difficult to have a user keep it. That is, the method of entrusting the user with the management can not be a fundamental solution.

In order that many users share and manage various types of documents in a document management system with a folder layered structure, it is important for each user to have recognition of the three following points:
1. Document names
2. Storage locations of documents (folder and path)
3. How to use user interfaces and commands for executing processing For example, in a case of registering a document, it is required to recognize in which folder among a folder layer the document should be stored. In a case of opening a desired document, it is required to recognize where the desired document is and what document the desired document is.

In a case of opening a document, it is required to understand what series of operations are required to be performed to a user interface.

That is, at the time of sharing a document, when the document is registered considering in which folder the document should be stored for easy access to the document and what document name should be produced for efficient access to the document, it results in a need of a lot of workforce.

In a case of opening a document a storage location of which is not clear, it is needed to search for a location where the document is placed by document name search. In a case where a folder in which a document is stored is known, it is required that the folder is opened to view a document list, and search for a target document from the document list is carried out.

However, even if the document name is known, in a case where the document with the same name is stored in a plurality of folders, there are many cases where determination on in which folder the desired document is provided can not be made.

Also in a state where documents are actually shared using the document management system or the file server, there are many cases where the storage location of the desired document or the accurate document name can not be recognized, leading to requiring many labor forces for searching. Actually, versions in regard to the document are produced at a random and therefore, many similar documents exist. In consequence, a user actually searches for a desired document with difficulty from information such as a date of the document or a memory of the document content.

A rule is needed for sharing and managing a document in a document management system. However, if such a rule is not suitable for various, actual use states and users, a user feels that a rule is rigid or inelastic and it is difficult to handle.

Further, when a rule is described at length with plenty of detail, it is required for a user to perform an operation after recognizing all of the rules. Such a system is very difficult for a user to use.

SUMMARY OF THE INVENTION

An aspect of the present invention is to solve the aforementioned problem in a way that a document management system reads in information of a customized template short cut to produce a menu, and also executes processing according to the setting of the short cut at the time a user selects the menu.

According to one aspect of the present invention, a client device connected to a document management server via a network is provided. The document management server manages a document stored in a storage and keeps at least one document managing rule. The client device comprises an editing component configured to edit a template which includes information for an operation performed to a document, information for a name of a menu to be registered in the client device, and an identifier of a document managing rule; an obtainment component configured to obtain a document managing rule from the document management server, wherein the obtained document managing rule is specified by the identifier which is included in the edited template; a determination component configured to determine whether or not an operation which is included in the edited template is pursuant to the document managing rule which is obtained by the obtainment component; and a registration component configured to register a name of a menu instructing to perform the operation in the client device if it is determined by the determination component that the operation included in the edited template is pursuant to the obtained document managing rule, and not to register the name otherwise.

According to the present invention, the document operation suitable for an individual user can be used as the menu. In consequence, the operation content optimized for each user can be registered.

It is possible to perform a series of document operations with an operation from the menu.

When the document management system checks the content described in the template customized at the registering, a user can be forced to completely observe a basic rule.

Further features of the present invention will become apparent from the following description of exemplary embodiments (with reference to the attached drawings).

BRIEF DESCRIPTION OF THE DRAWINGS

FIG. 3 is a diagram showing an attribute management data table composed of menus, commands and the like stored in a menu and command storage in FIG. 2.

FIG. 4 is a diagram showing an attribute management data table of rules used in the document management system stored in a rule storage in FIG. 2.

FIG. 5 is a diagram showing a data table of a text file outputting a registration content stored in the menu and command storage in FIG. 2.

FIG. 6 is a diagram showing an attribute management data table explaining attribute information stored in a batch file outputting the registration content stored in the menu and command storage in FIG. 2.

FIG. 7 is a diagram explaining an operation after activating the batch file by a PC of a DMS client or the like.

DESCRIPTION OF THE EMBODIMENT

Figure 1:
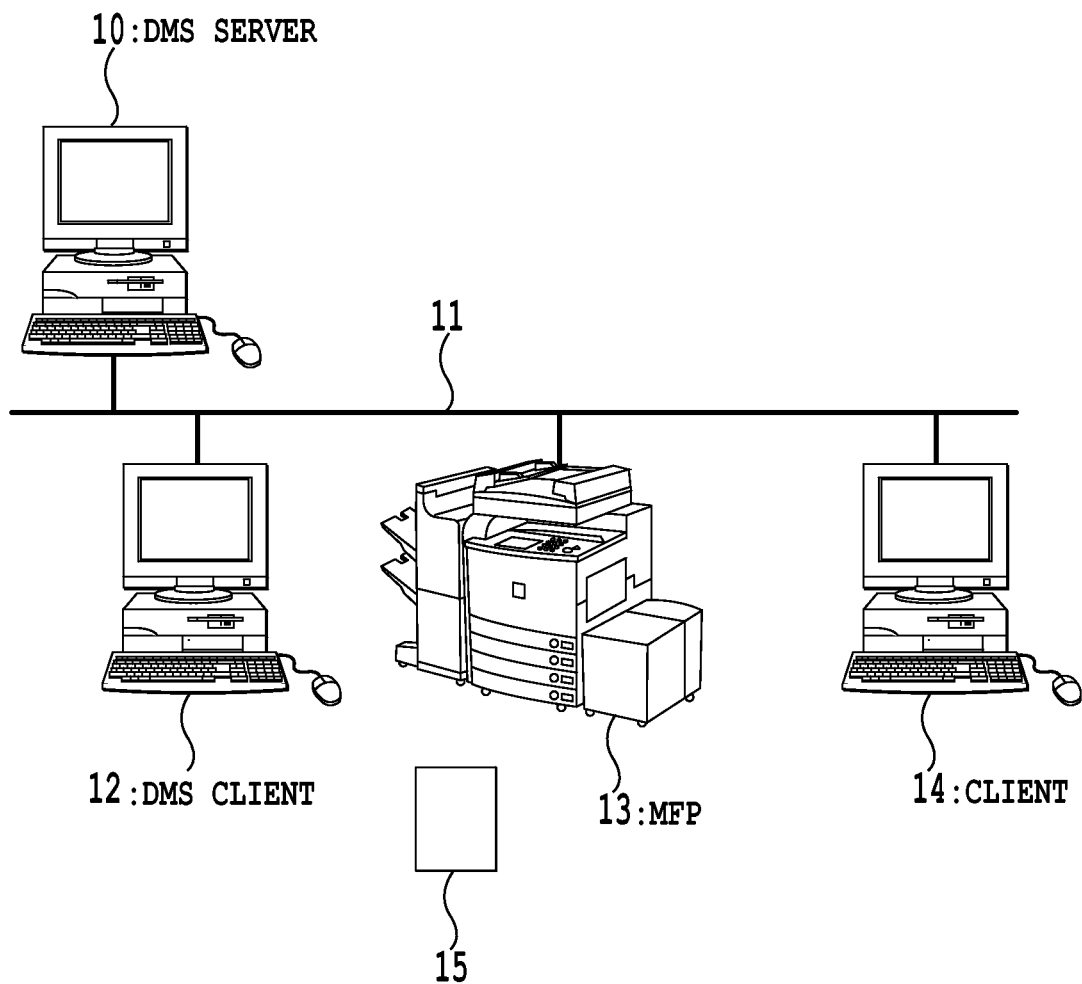
FIG. 1 is a system block diagram of a document management system in an embodiment of the present invention.

A first embodiment of the present invention will be described below referring to the drawings. FIG. 1 is a block diagram showing a schematic construction of a document management system (DMS) according to the present invention.

All equipment and devices can transmit information through a network 11.

A DMS server 10 acts as a server of a document management system according to the present invention and documents are accumulated in the DMS server 10 and then managed. The DMS server 10 can be a computer that manages a resultant matter in a form of electronic data dealt by the system. The DMS server 10 executes a network processing realized by a known technology and besides, mainly carries out building of a document database, transmitting/receiving processing of document data among devices, security management for performing an access control, exclusive control processing among a plurality of users, managing database accumulating document data, and the like. A detail of the DMS server 10 will be described later with reference to FIG. 2.

A DMS client 12 acts as a client of the DMS server 10. In the present embodiment, a client application of the document management system is installed in the DMS client 12 and performed.

It is assumed, in the embodiment explained below, that the client application of the document management system is not installed in a client 14.

It is noted that the DMS client 12 is a personal computer with which a user actually performs an operation of document data, such as input, reference, and output thereof. FIG. 1 shows an illustrative environment of the document management system where one DMS client is provided to one server, but an alternative environment of the document management system where a plurality of DMS clients are connected to one server may be implemented. Each of the DMS client 12 can share a MFP (Multi Function Peripheral) 13 using a known technology and control an operation of the MFP 13 via the network 11.

The DMS client 12 serves to read a document through a scanner of the MFP 13 mainly for storing the document in the DMS server 10, and to directly store the read data in the DMS server 10. In addition, the DMS client 12 also serves to read a content of a document and to set a document attribute to the read data, which thereby is directly stored in the DMS server 10. The DMS client 12 can control the MFP 13 to print out a document stored in the DMS server 10 on a paper.

In addition, the DMS server 10, the DMS client 12, and the MFP 13 can be communicated with each other. Therefore, the document management system may have an environment where each client 12 is connectable to the server 10 for an operation.

The MFP 13 connected to the network 11 can hold communication with the DMS server 10, the DMS client 12, and the client 14. The MFP 13 comprises a scanner for reading characters, graphics, images and the like printed or described on a paper and output an electronic data which is converted from them, and a printer for printing an electronic data on a paper. A paper document 15 (for example, a diary document) is scanned by the MFP 13.

It is noted that the present embodiment explained below is configured in such a manner that an input device and an output device are incorporated into a Multi Function Peripheral, but a document management system according to the present invention may be configured so that an independent scanner reads a document and an independent printer prints a document.

Figure 2:
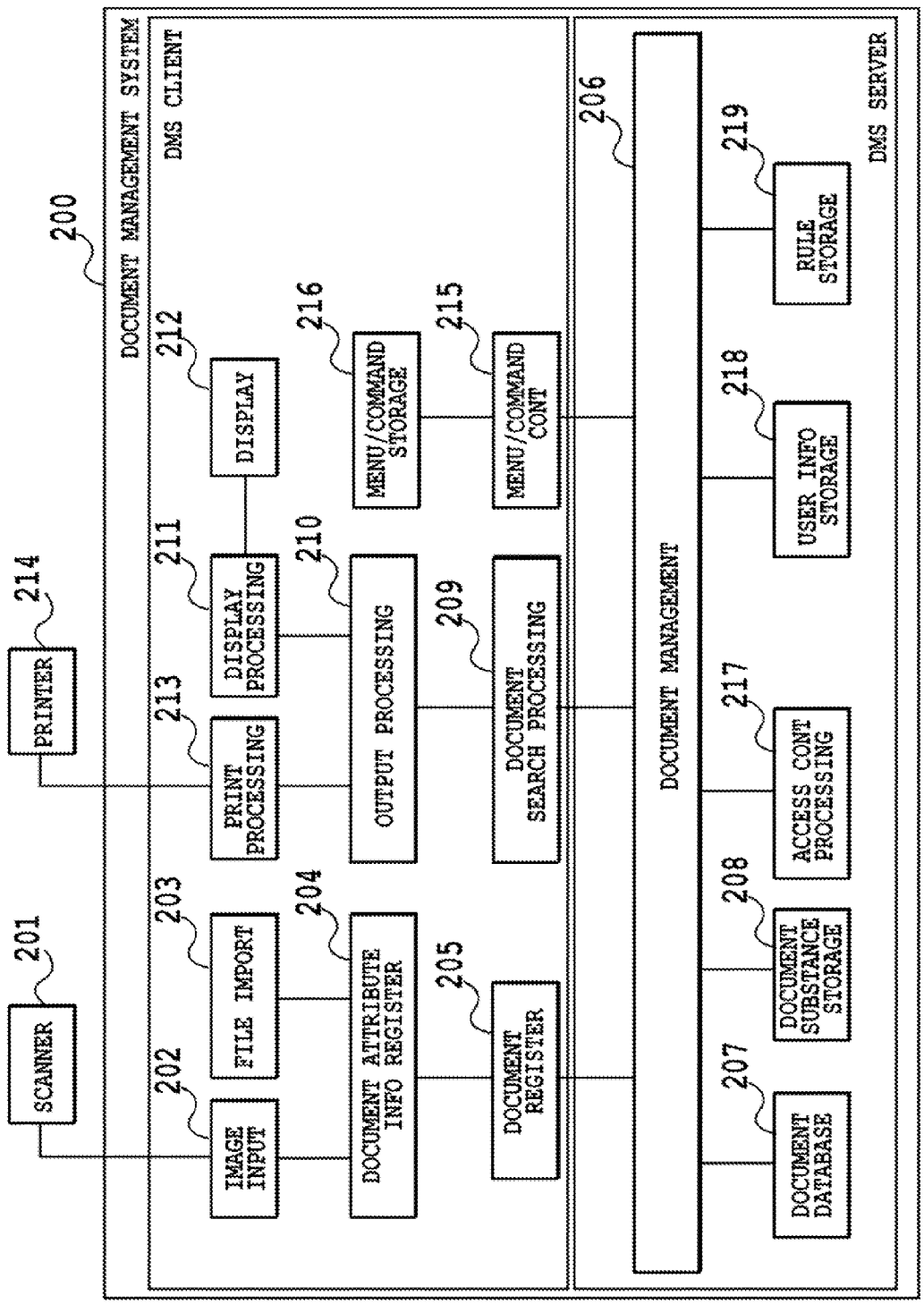
FIG. 2 is a system block diagram of a document management server or client in the embodiment of the present invention.

FIG. 2 is a block diagram showing functional elements constituting a document management system of the present embodiment. A document management system 200 is constructed of the DMS server 10 and the DMS client 12.

It is noted that FIG. 2 shows one example in which any one of the DMS server 10 and the DMS client 12 mainly executes the processing for realizing the respective functional elements of the document management system, but the present invention is not limited to the construction in FIG. 2. For example, the document management system may be configured in such a manner as to execute a part of the processing to be executed by the DMS client 12, by the DMS server 10. For example, the document search processing is executed in cooperation with a document management section of the DMS server according to instructions from a document search processing section of the DMS client. In addition, applying attribute information to a document may be made by either of the DMS server and the DMS client. At the time of printing a document managed by the DMS server, the document image data may be processed to be directly printed without the DMS client based upon instructions from the DMS client.

In the present embodiment, a scanner 201 and a printer 214 are designed to be provided by the MFP 13. The DMS client 12 is provided with an image input section 202, a file import processing section 203, a document attribute registration section 204, and a document registration section 205. The DMS server 10 is provided with a document management section 206, a document database 207 and a document substance storage 208.

A user puts a document to be registered on the scanner 201, which executes reading processing of an image for the document. The scanned document image data is inputted through the image input section 202. The document of a registration target is not limited to a document image input from the scanner, but the file import section 203 may import a document file stored in a memory medium such as a hard disc to register the document.

Thereafter, document attribute information is given to the document data of the registration target by the document attribute information registration section 204, which will be transmitted from the document registration section 205 to the DMS server 10 for registering. In addition, the document management section 206 registers a substance of the received document data to the document substance storage 208 and document attribute information registered in the document attribute registration section 204 is stored in the document database 207. It should be noted that, since the document attribute information and the document data are linked to be stored in the document database 207, in a case of the searching with the attribute information, the corresponding document data can be easily specified. In addition, in FIG. 2, the document substance storage 208 is described as a part of the DMS server 10, but is not limited thereto. A file server device (not shown) connected through the network may act as the document substance storage 208.

The DMS client 12 is further provided with a document search processing section 209, an output processing section 210, a display output processing section 211, a display 212, and a print out processing section 213.

When a user searches for and refers to any document from documents managed in the DMS server 10, instructions to search document are made by the DMS client 12.

The document management section 206 detects document attribute information from the document database 207, which information matches a condition instructed from the document search processing section 209. The output processing section 210 obtains a substance of the corresponding document stored in the document substance storage 208 through the document management section 206 based upon the document attribute information searched by the document search processing section 209. It should be noted that when a substance of the document is compressed or encrypted to be stored at the document substance storage 208, the output processing section 210 decompress or decrypts it.

The display output processing section 211 carries out development processing to a display memory (not shown) and display a state of the memory on the display 212 so that a user can confirm a content.

When a user carries out printing, the print out processing section 213 likewise carries out development processing of the document data obtained by the output processing section 210 to a print memory (not shown) and the printer 214 prints out the information.

The DMS client 12 is further provided with a menu and command control section 215 and a menu and command storage 216. The DMS client 12 additionally registers a menu showing a standard operation composed of one or more command to a menu list on a user interface by the menu and command control section 215 and the menu and command storage 216. The DMS server 10 can produce a template used for registering the menu of the standard operation and can distribute the template to other users.

When a user selects the menu by the user interface, the menu and command control section 215 obtains a processing content corresponding to a selected menu from the information stored in the menu and command storage 216 and executes specified processing.

The DMS server is provided with an access control processing section 217, a user information storage 218, and a rule storage 219. The user information storage 218 stores and manages user information of a user who may use the document management system 200. The access control processing section 217 refers to the user information of the user registered in the user information storage 218 based upon an access control list (ACL) corresponding to the document stored in the document database 207 to control an operation range and operation information of the user.

The rule storage 219 stores rules required for operating the document management system 200. Here, at the time of producing a template for additionally registering the menu showing a standard operation composed of one command or more to the menu list of the interface, a rule determined by a manager is stored therein. In addition, when the user implements the menu to perform the operation, it is determined whether or not the operation target is against the rule stored in the rule storage 219. The rule storage 219 stores therein rules such as an upper limit of a file size and a location where the file is prohibited to be stored.

FIG. 3 is a diagram showing a data table of attribute information for menus stored in the menu and command storage 216.

Identifiers of the menus of the user interface are stored in an ID 300.

A menu 301 shows menu names for showing plural kinds of processing contents and is a column for storing character strings of menus actually viewed on the display 212 as the user interface. The menu and command control section 215 obtains and views the plural kinds of character strings from the menu 301. In the embodiment explained below, character strings of menus "open a document", "register a document" and the like are stored in the menu 301. When the menu is viewed, these character strings are viewed on an actual user interface.

The command 302 is a column for storing commands of plural kinds of processing contents corresponding to the menu 301. When a user selects a menu, the menu and command control section 215 obtains a command corresponding to the selected menu from the command 302 and the document management section 206 executes the processing. It shows that, in the embodiment explained below, a command "view" is executed when the menu of "open a document" is performed.

In path information 303, a processing target path that is required for processing of each command of the command 302 is stored. It should be noted that in a case of a command which does not require a target path, the corresponding path information 303 is a blank column. In FIG. 3, the processing of "view" is stored to a menu identifier M1. In addition, a path "¥¥Cabinet¥Doc¥" is stored in the corresponding path information 303, which shows that a view operation for the path "¥¥Cabinet¥Doc¥" is performed.

If a limitations to an operation target exists when a user performs a menu, an identifier of a corresponding rule to the limitation is stored in the rule 304. In the embodiment explained below, identifiers of the rule such as a maximum document size, a maximum document name length, an extension and the like are stored in the rule 304. Rules "1", "2" and "4" are stored in the rule 304 corresponding to the menu identifier M1, which correspond to rules 401, 402 and 404 in FIG. 4. The rules "1", "2" and "4" respectively show limit values in regard to the maximum size of the file, a location (path) where the file must not be put, and a type of the file (a file format).

FIG. 4 shows a data table of rule information stored in the rule storage 219.

ID 400 of each rule is managed as identifiers of the rule.

Reference numeral numbers 401 to 404 indicate examples of rules. In the example shown by FIG. 4, the rule 401 limits a limit value to a file size of a document, and it is shown that the file size is equal to or less than 2 MB. The rule 402 stores a location where a document is prohibited to be arranged. In the example shown by FIG. 4, it is shown that a document is prohibited to be placed at a root in a hierarchy. The rule 403 limits a maximum length of the file name and in the example shown by FIG. 4, it is shown that a length of the file name is required to be equal to or less than 20 bites. The rule 404 limits file formats of a document capable of being stored in the document management system 200 and in the example shown by FIG. 4, it is shown that document file formats capable of being stored in the document management system are doc, xls, ppt and pdf.

FIG. 5 shows data of a template file for being additionally registered as a menu. When a new menu is added based upon the template file, the menu list can be customized to simply perform an operation from the menu. Therefore, the operation can be easily performed according to the rule of the document management. In an example explained below, a template of the menu is supplied in a form of a file. A data format of the template file is a text format and the template file may be edited by an arbitrary editor.

A reference numeral number 500 shows an area in which cabinet names are stored and in the example of a template file in FIG. 5, an operation corresponding to a cabinet of a name stored in the area 500 is registered. In the example shown by FIG. 5, an identifier of "DMSV development" is stored in the area 500 and it shows an operation to the cabinet named DMSV development.

A reference numeral number 501 shows an area for describing a path, which is described in a case of an operation of specifying a location. In the example shown by FIG. 5, "¥¥DMS¥DMSV development¥DOC¥" is described, and it is shown that an operation to a document name stored in an area 502 is performed in that path.

The area 502 stores a document name, and it is shown that a document name stored in the area 502 is a processing target. In the example shown by FIG. 5, a document name "development diary" is stored and an operation for the name is performed.

Indexes 503 and 504 are index information added to an operation target. Even if a document name stored in 502 is changed or stored in a different location later, a search for a document is performed using the indexes 503 and 504 as search keys to specify the document.

Reference numeral numbers 505 and 506 show operations (commands of processing contents) and the operations described herein shall be performed. An operation "register" is stored in the area 505 and an operation "view" is stored in the area 506. Therefore, processings of "register a development diary" and "view a development schedule table" respectively are executed.

A reference numeral number 507 shows an object name as object information, which is a name or a character string showing a processing target. The object name is used for producing menu names registered in this template in combination with the operations 505 and 506. Production of a menu will be described later.

A reference numeral number 508 shows a rule and an identifier corresponding to the rule shown in FIG. 4 is stored therein. Here, a new menu is registered based upon the template shown in FIG. 5 and an identifier showing which rule is referred to upon executing processing of the menu is stored. FIG. 5 shows the example of the template file which stores identifiers 1, 2, and 4. When a document management client application read the template file shown by FIG. 5 to register a new menu, as described later, the identifiers 1, 2, and 4 will be registered in the corresponding rule 304 in FIG. 3. Accordingly, when a new menu is registered or when a processing of the newly registered menu is executed, a determination is made as to whether or not the registration or processing operation is pursuant to the rules 401, 402, and 404 shown by FIG. 4.

In the present invention, a template file constructed of the data as shown in FIG. 5 is produced based upon instructions by a manager or the like. The produced template file is distributed to each user. In addition, the produced template file is read in with an application of the DMS client (document management client application) operated by each user, thereby registering the template file as a new menu in the menu list (short cut menu). A detail of the production processing of the template file and the menu registration processing using the template file will be described later with reference to FIGS. 8 and 9.

That is, according to the present invention, a user (for example, a manager) can produce a template file (short cut template) in which a menu (short cut menu) for performing a series of processing contents can be easily registered in an application. Since a user who has received the template file can add the menu to a DMS client application using the template file, the user can easily perform the operation of a series of the processing contents. The processing content (operation) imported to the template (FIG. 5) by the user is registered in the DMS client application as a menu and the user selects the menu to cause the system perform the menu, and thereby the DMS client 12 executes the processing according to the registration content.

The following will explain an example in regard to a procedure in registering the menus of "registering a schedule" and "open a schedule" to the user interface operating in the DMS client 12.

In the present embodiment, there will be explained the procedure from a step in which a manager produces a template to a step in which the produced template is registered to the client application of the DMS client 12 shown in FIG. 1.

Figure 8:
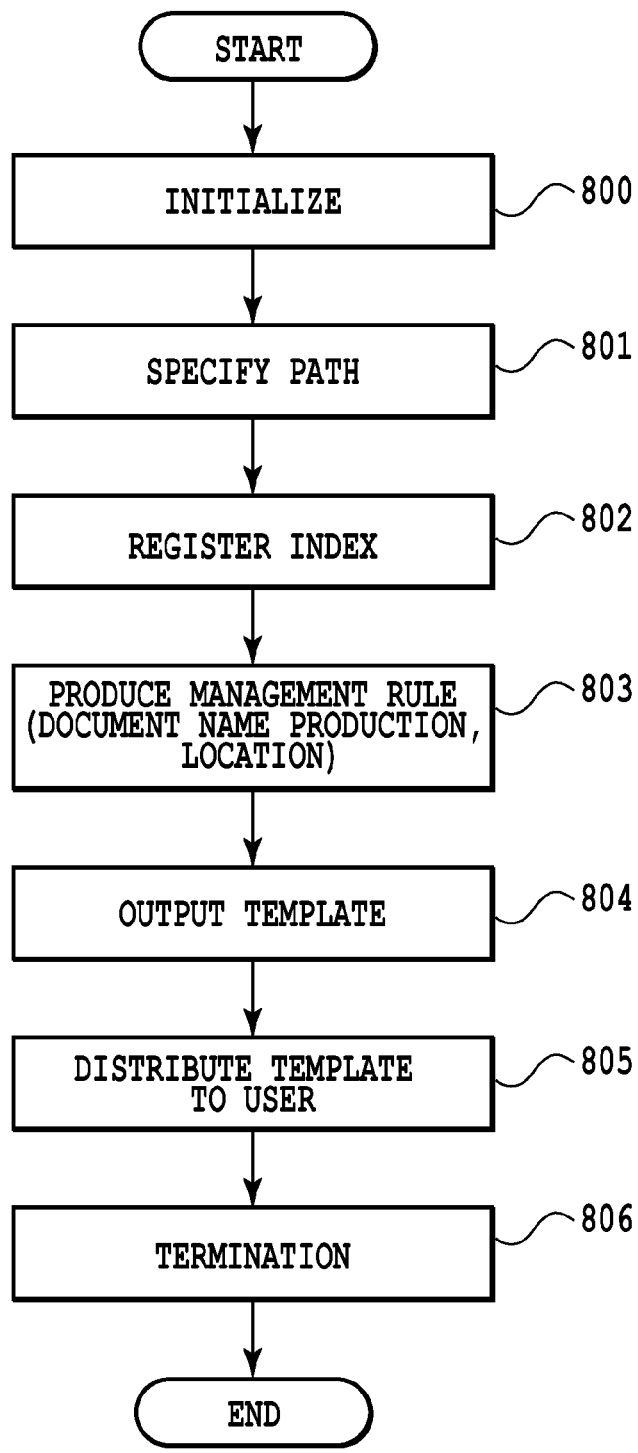
FIG. 8 is a flow chart explaining the process order until the registration content shown in FIG. 5 is outputted to be distributed to a user in the document management system.

FIG. 8 is a flow chart explaining the present embodiment and the flow chart explains the procedure until a manager produces the template shown in FIG. 5 in a system constructed of the DMS server 10, the DMS client 12 among the elements in the system shown in FIG. 1. In the present embodiment, a template is supposed to be produced in the DMS server 10 based upon instructions made in the DMS client 12 operated by the manager.

At step 800, initialization processing is executed. Personal computers such as the DMS server 10 and the DMS client 12 are activated and initialized, and the network system is activated. Further, the connection processing to the network system is executed through the network 11. These processing can be executed by a known technology and therefore, a detailed explanation thereof is omitted.

At step 801, a cabinet of the operation target and a path in the cabinet are specified. In the example in FIG. 5, the cabinet of "DMSV development" is specified and the path of "¥¥DMS¥DMSV development¥DOC" is specified. The processing of "register a document" and the processing of "open a document" to this path are executed. Therefore, since the path is not yet produced, it is preferable that the manager produces a folder structure (path) in advance.

At step 802, an index is registered. In the present embodiment, the indexes 503 and 504 shown in FIG. 5 are in advance produced, which are registered in the document management system 200 in such a manner as to be capable of being registered as search keys of a document.

At step 803, there are indicated the document name 502 of the operation target, the operation contents 505 and 506, the object name 507 used when a manager produces the default name of the menu, and a rule which the manager uses at the document management system 200. The rule is produced and registered by the manager in order to avoid that when a user freely registers a document, various files are registered at random to make the management be difficult.

In the present embodiment, the produced rule is registered in the rule storage 219 shown in FIG. 2 as shown in FIG. 4. In the example in FIG. 4, there are registered rules 401 to 404 composed of a rule that the full size is defined as 2 MB or less, a rule that a root in a hierarchy is defined as document registration prohibition, a rule that the length of the file name is defined as 20 Byte or less and the other rule.

After the above jobs are completed, at step 804 a manager carries out production and export of the template file in the document management system 200 installed in the DMS server 10. The document management section 206 obtains the cabinet name indicated as the operation target from the document database 207. In a case of the present embodiment, the cabinet name of "DMSV development" is obtained to be stored in the area of 500 in the template file. Next, the path indicated and produced at step 801 is stored in the area of 501. In the present embodiment, the path of "¥¥DMS¥DMSV development¥DOC" is obtained to be stored in the area of 501. In regard to the index, the index name produced at step 802 is stored in the areas of 503 and 504. In the present embodiment, the index names such as "schedule table" and "DMSV development" are stored. In regard to the operation, the document management section 206 stores the indicated operations in the areas of 505 and 506. In a case of the present embodiment, "registration" and "view" are stored in the respective areas, but the user interface may be configured so that the manager can arbitrarily select other operations or an operation may be automatically selected among possible operations in advance defined in the document management system. In regard to the object name of 507, "schedule" is indicated, but in a menu registration processing to be described later, the user can arbitrarily rewrite the object name by a customized flow. In the rule 508, the content of the rule storage 219 is stored. In a case of the present embodiment, the identifiers 1, 2, and 4 of the indicated rules are stored. The rule can be outputted in a manner which allows the manager or the user to rewrite the output rule arbitrarily. If strictly managed, however, it is preferable to output the rule 508 in the template file in a non-rewritable state, which does not allow a change of the rule by the user. The rule 508 in the embodiment is outputted in a non-rewritable state.

With the above processing, the template as shown in FIG. 5 can be produced to be exported. The manager distributes the template to the user at step 805. The distribution of the template file may be carried out through the document management system, an electronic mail or the like. With the above processing, the production and the distribution of the template are completed. At step 806, release processing of the memory or the like is executed to terminate the process.

Figure 9:
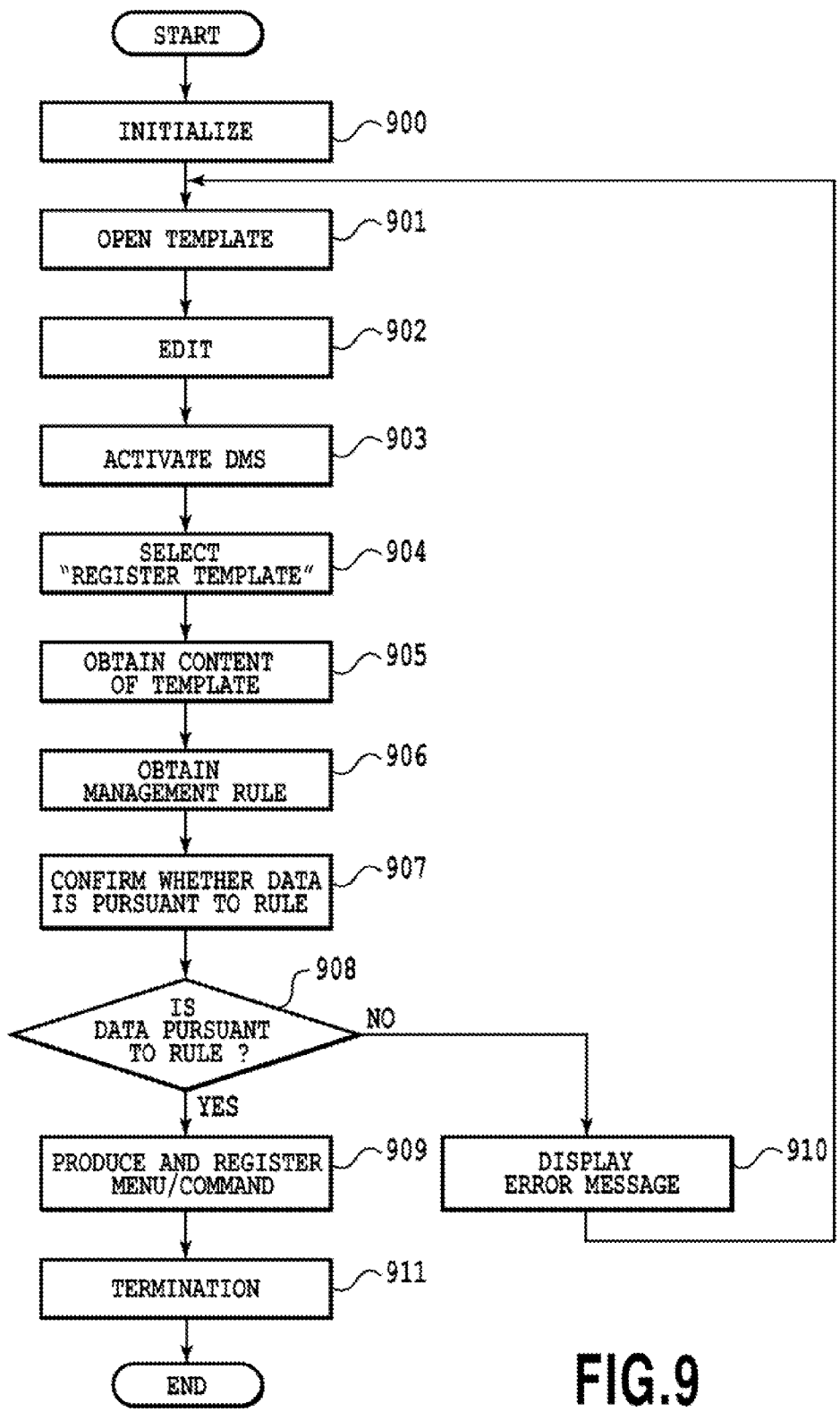
FIG. 9 is a flow chart explaining the process order and the processing for performing the menu registered in FIG. 8 and registering a document in the document management system.

FIG. 9 is a flow chart showing the processing registering the description content as a new menu (short cut menu) in the DMS client 12 using the template file produced and exported by the processing in FIG. 8. At the time of registering this menu, the user may customize the menu name and the like.

The customizable template is in the form of data which can be edited and customized, and information necessary for registration, display, and search of the document is stored therein. The information for indicating the operation such as "registration" and "view", and "object name" such as the document name are stored. These pieces of information are registered as the menu of the document management system. This document management system has a feature that the information in regard to the operation and the object name is automatically produced as the menu name, and the operation performed to the document, the information added to the document and the like are registered as processing information to the menu in the document management system. In addition, in the template of the short cut, the information is registered after it is determined whether or not it is pursuant to a minimal rule to be observed, such as a rule of a storage place or a document name. Therefore, the template of the shirt cut has a feature that the processing pursuant to the minimal rule can be registered. Different from a menu prepared from the beginning in the document management client application, the optimized menu for a user can be displayed, making it possible to provide the menu which is easily treated intuitively.

At step 900, initialization processing is executed. Activation and initialization of personal computers of the DMS server 10, the DMS client 12 and the like, and activation of the network system are performed. Further, the connection processing to the network system is executed through the network 11, but since the processing can be executed by a known technology, a detailed explanation thereof is omitted.

At step 901, for the customization, the processing of reading in and opening the template file shown in FIG. 5 by any edition software is executed. In a case of the present embodiment, since the template file is formed of a text format, the template file can be processed by any application enabling text edition.

At step 902, edition of the template file is arbitrarily carried out. Almost all of the items are automatically outputted, but, for example, since the object name of 507 is a name displayed in a menu, a user may arbitrarily rewrite it. Further, the path 501 registered in the template file may be changed to "¥¥Cabinet¥Doc", for example. It should be noted that in a case where the menu name or the like is not customized, it is not necessary to execute the processing of steps 901 to 902.

At step 903, the client application of the DMS client 12 is activated. When the document management client application is activated, a user interface is displayed for performing various operations of the document management.

At step 904, when "registration of the template" is selected from a menu list of the displayed user interface by a user, menu registration processing is started based upon the template file. The processing content corresponding to this menu list is registered in the menu and command storage 216 shown in FIG. 3, and it is assumed that the menus of M1 and M2 are not yet registered before a new menu registration by the template file is carried out.

At step 905, when the template file shown in FIG. 5 is selected by a user, the document management section 206 obtains the template file the content of which will be analyzed.

At step 906, the document management section 206 obtains a rule by the rule storage 219. Since the template file shown in FIG. 5 is rewritable arbitrarily by a user, there is a possibility that the rewritten content is not pursuant to a use rule of the document management system 200 (a condition of the rule is not met). Therefore, at next step 907, the rule obtained at step 906 is compared with the content described in the template to determine whether or not the content is pursuant to the rule. That is, it is determined whether or not the file size, the location of the folder, the length of the file name, and the like are appropriate.

In the determination processing at step 908, in a case where it is determined that all of the above contents are appropriate values (YES at step 908), the process goes to step 909, wherein contents of the edited template such as menus and commands are registered in the menu and command storage 216. In a case of the template file in FIG. 5, the menus of M1 and M2 in FIG. 3 are registered. Here, the object name ("schedule") and the operation ("registration" and "view") are combined to produce the menu name 301, which will be registered. In addition, the command 302, the path 303, and the rule 304 corresponding to each menu are registered. In addition, in regard to the menu of "registration", the indexes 503 and 504 applied at registering are also related thereto.

On the other hand, in the determination processing at step 908, in a case where it is determined that the above content is an inappropriate value (NO at step 908), the process goes to step 910, wherein the message that the inappropriate item exists is displayed to invite a user to correction. In this case, the registration processing is interrupted and the user is required to restart with step 901.

At step 911, the release processing of the memory or the like is executed to terminate the process.

In the menu 301 shown in FIG. 3, the operation names 505 and 506 and the object name 507 stored in the template shown in FIG. 5 are combined to automatically produce the menu name. The object name may be customized by each user. In consequence, one of the features in the present invention is to be capable of easily registering the menu name which is easy to be recognized by a user.

Figure 10:
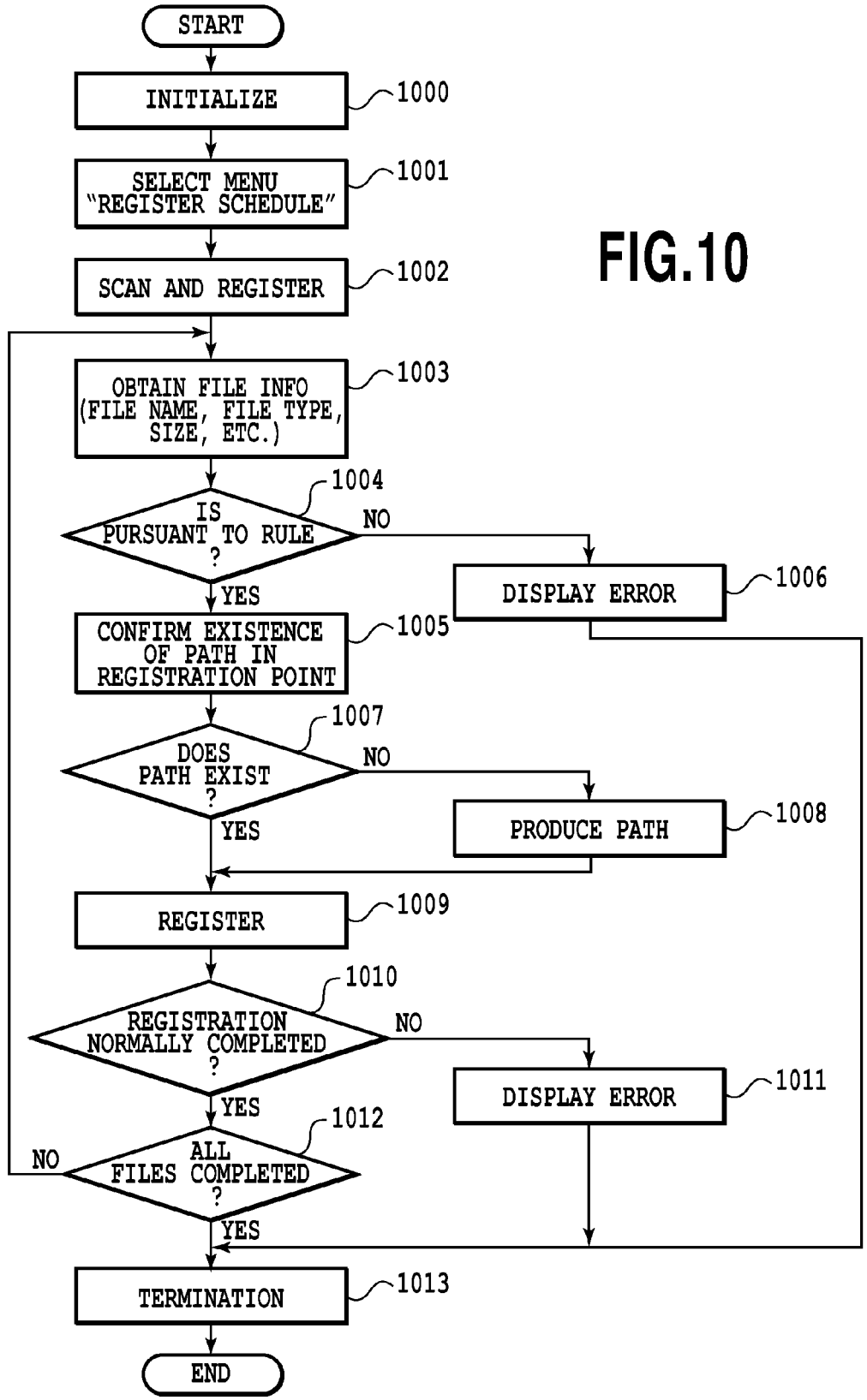
FIG. 10 is a flow chart explaining the processing in which the menu registered in FIG. 8 is exported as a batch file and the batch file is performed, which thereafter is registered in the document management system.

FIG. 10 is a flow chart showing the process order in a case of selecting and executing "registering a schedule" of the menu registered in the process order of the flow chart shown in FIG. 9.

The following example explains the process order in which a paper document (for example, a schedule table 15) is scanned by the MFP 13 and the scanned data is registered in the DMS server 10 using "register a schedule" of the menu registered in the user interface of the client application in the DMS client 12.

At step 1000, initialization processing is executed.

Activation of personal computers of the DMS server 10, the DMS client 12, the DMS client 14 and the like, activation and initialization of the MFP 13, and activation of the network system 11 are performed. Further, the connection processing to the network system is executed through the network 11, but since the processing can be executed by a known technology, a detailed explanation thereof is omitted.

At step 1001, "register a schedule" of the menu is selected and executed. The menu command control section 215 obtains the command 302, the path 303 and the rule identifier 304 corresponding to the selected menu from the menu command storage 216 and starts the registration processing.

At step 1002, the schedule table 15 which is a manuscript placed on a manuscript platform of the MFP 13 is scanned and the scanned data is transmitted to the scan DMS server to be registered therein. At this time, the information of a command, a path, a rule identifier, and an index corresponding to the scanned data are also registered. In addition, in a case where the file name exists, the file name is also transmitted. The present embodiment is explained using an example in which the document scanned by the MFP 13 is operated for registration, but a document of the registration target may be obtained from another personal computer or device which can make communication through the DMS client 12 or the network 11.

At step 1003, the document management section 206 in the DMS server receives information of the registration target document to obtain information of the document of the received registration target. That is, a filename, a file type, a file size and the like of the document are obtained.

At next step 1004, the rule specified by the rule identifier from the rule storage 219 is compared with the information obtained at step 1003 to determine whether or not the document is pursuant to the rule.

In a case where in the determination processing at step 1004 it is determined that the document is not an appropriate document (NO at step 1004), the process goes to step 1006, wherein an error message showing the event that the registration can not be performed since the document is not the appropriate document is transmitted to the DMS client for the displaying, and the registration processing is canceled.

On the other hand, in a case where in the determination processing at step 1004 it is determined that the document is the appropriate document (YES at step 1004), the process goes to step 1005, wherein it is confirmed whether or not the path at the registration point exists. More specifically, the confirmation processing on whether or not the path stored in the path information 303 shown in FIG. 3 exists is executed.

At next step 1007, it is determined whether or not the path at the registration point exists. In a case where the path exists (YES at step 1007), the process goes to step 1009. on the other hand, in a case it is determined that the path does not exists (NO at step 1007), the process goes to step 1008, wherein the document management section 206 produces the path stored in the path information section 303 and thereafter, the process goes to step 1009.

With the above processing, it is determined that the document to be registered and the registration point of the document are pursuant to the rule of the document management system 200 and also are appropriate, and it is confirmed that the path in the registration point exists. Therefore, the registration processing is executed at step 1009.

At step 1010, it is determined whether or not the registration processing is normally executed. In a case where it is determined that the registration processing is not normally completed (NO at step 1010), the process goes to step 1011, wherein an error message showing the event that the registration of the file can not be performed is displayed by the DMS client, and the registration processing is canceled.

On the other hand, in a case where at step 1010 it is determined that the registration processing is normally completed (YES at step 1010), the process goes to step 1012, wherein it is determined whether or not the registration for all of the document files to be registered is completed. In a case where the remaining file exists (NO at step 1012), the process returns to step 1003. In a case where the registration for all of the document files to be registered is completed (YES at step 1012), the process goes to step 1013, wherein the release processing of the memory is executed to terminate the process.

The processing to be executed in a case where the menu of "register a schedule" registered using the template shown in FIG. 5 is selected by a user is executed as described above.

In this way, according to the present embodiment, since the template file for menu registration can be produced to be distributed to other users, the other user can easily register a menu using the distributed template file. In addition, since the rule for the document management is together registered in the template file, the processing results in being executed according to the rule. Therefore, a manager of the document management system can inform a user of the minimal basic rule completely and the user can easily register and perform an optimal menu operation.

A second embodiment of the present invention will be described below referring to the drawings. The aforementioned first embodiment shows an example where when a processing of reading in a template file in a client application file of a DMS client is indicated by a user, a new operation menu is registered. The present embodiment will further explain a processing that is executed when an operation menu is outputted as an independent execution file and then the file is executed.

FIG. 6 shows an example of a data management table produced when a template is outputted as a batch file equipped with an independently executable batch function.

In an area 600, a cabinet name which has been selected at outputting the template is stored. Herein, a name of "DMSV development" is outputted and stored, which shows that the batch file performs an operation to a cabinet named "DMSV development".

A reference numeral number 601 shows an area for storing a path, and a value stored in the path information 303 in FIG. 3 is stored in the area 601 in case of a location indicating operation. FIG. 6 shows that a path "¥¥Cabinet¥DOC¥" is stored in the area 601 when a menu with the identifier M1 in FIG. 3 is outputted.

In a case of having an access to an operation target with a Web application such as Web browser, an operation target can be connected with a URL 602.

A reference numeral number 603 show a document name, the document name 603 shows a document of a processing target. Herein, a document name "V development schedule table" is stored and an operation is performed for the document name.

Indexes 604 and 605 are index information added to an operation target. Even if the document name 603 is changed or stored in a different location later, a target document can be specified by using the indexes 604 and 605 as search keys when a search is carried out.

Reference numeral numbers 606 and 607 show operations (commands of the processing content) and the operations described herein shall be performed. An operation "registration" is stored in the area 606 and a operation "view" is stored in the area 607. Therefore, processings of "register a V development schedule table" and "view a V development schedule table" respectively are executed.

A reference numeral number 608 shows an object name as object information, which is used at a time of automatically producing a character string of a menu button in a user interface displayed upon activating the batch file. The object name 608 stores a default name and character string for identifying a processing target. Production of the character line will be described later.

A reference numeral number 609 shows a rule and an identifier indicating which rule is referred to among the rules shown in FIG. 4 at a time of executing a menu by a batch file equipped with a batch function is stored therein. Here, 1, 2, and 4 are stored, and thus it is determined whether or not the rules 401, 402, and 404 shown in FIG. 4 are followed at a time of executing a processing.

In an area 610, an execution program is stored. The program executes a flow chart to be described later as a batch file or displays a dialogue as shown in FIG. 7

Figure 7:
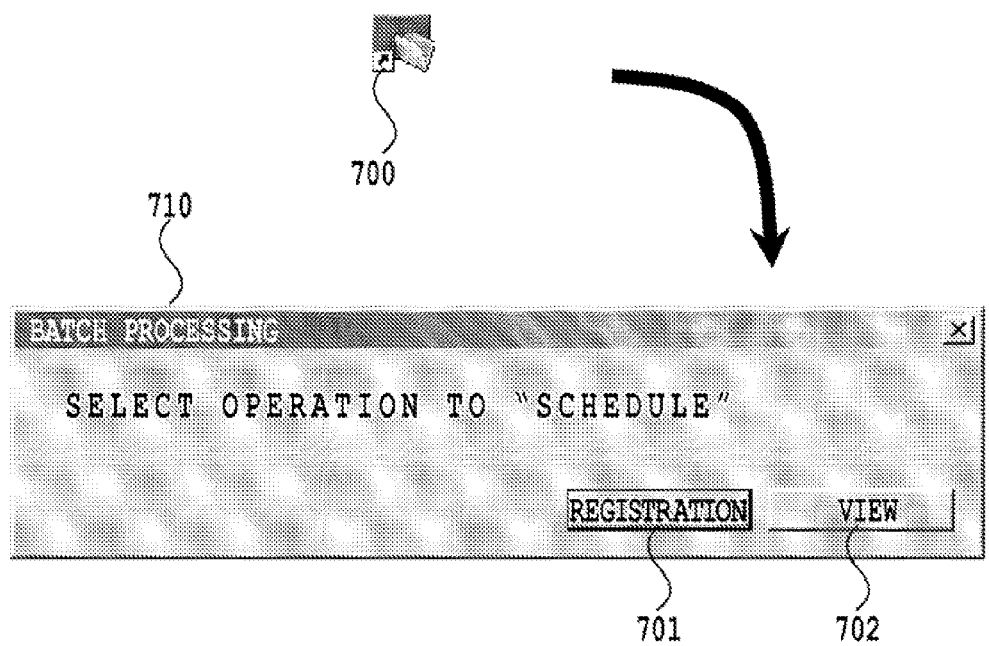
Figure 11:
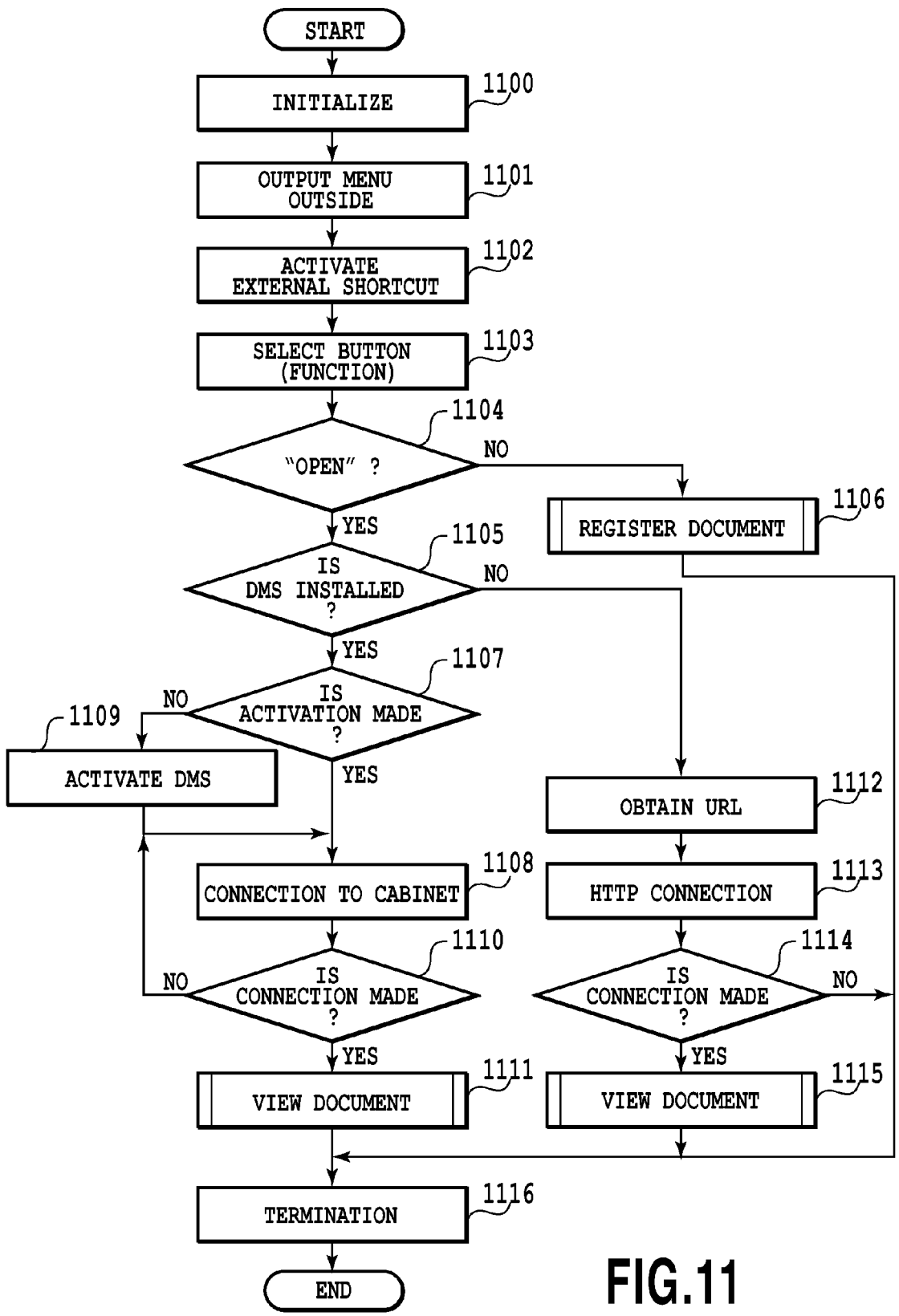
FIG. 11 is a flow chart explaining the processing in a case of outputting a menu to execute the processing by a double click.

FIG. 7 is a diagram explaining an operation at the time of the processing from steps 1100 to 1103 shown in FIG. 11. When a user makes a double click on a batch file 700 outputted as a template to activate the batch file, a dialogue such as a dialogue box 710 is displayed on a display 212. A button 701 for selecting "registration" and a button 702 for selecting "view" are displayed as operations to an object name of "schedule".

FIG. 11 is a flow chart showing the process order in a case of outputting outside the menu operation registered at the flow chart shown in FIG. 9 as a batch file and executing the batch file.

At step 1100, initialization processing is executed.

Activation and initialization of personal computers of the DMS server 10, the DMS client 12, and the like, and activation of the network system 11 are performed. Further, the connection processing to the network system is executed through the network 11, but since the processing can be executed by a known technology, a detailed explanation thereof is omitted.

At step 1101, a menu is output outside as the batch file equipped with an independently executable batch function. This output processing is executed by a user's operating the menu using a user interface of the document management system 200 installed in the DMS client 12. That is, when the user selects "output a menu outside" from the menu, the menu and command control section 215 outputs information in regard to the menu stored in the menu and command storage 216 as a batch file.

In a case of the present embodiment, 6 among ID 300 shown in FIG. 3 corresponds to a menu for indicating the outputting outside processing of the menus (M1 and M2) to execute the command corresponding to 6.

Items (600, 601, and 603 to 609) of the data management table (FIG. 6) in the batch file are obtained from the menu and command storage 216 shown in FIG. 3. The URL 602 is obtained based upon URL of a document of the operation target. The URL to the document is registered as document attribute information in the document database 207, and a value of the URL is obtained to be outputted to the URL 602, thereby outputting the URL.

Next, in the batch file, a batch file execution program is outputted to the area 610. This is a program for executing a processing to be described later according to the information of 600 to 609 obtained when a user activates the program file in a process to be described later.

At step 1102, in the DMS client 12, when a user makes double click on the batch file shown in FIG. 7, the batch file is activated. The client for carrying out the activation is not limited to the DMS client 12 and the activation may be carried out by the client 14 as a PC in which the client application of the present document management system is not installed.

The user interface shown in FIG. 7 is activated by such an activation operation, and the operations 606 and 607 shown in FIG. 6 are read in, which will be viewed as button names on buttons 701 and 702. In addition, the object name 608 is viewed as a name of the operation object file.

At step 1103, when a user selects a button and clicks on it, the process goes to determination processing of step 1104. In a case where "registration" is selected (NO at step 1104), the process goes to step 1106.

At step 1106, the registration processing of the document is executed. More specially, the document management section 206 registers the document at the document database 207 and the document substance storage 208, and a detail thereof is omitted.

On the other hand, when it is determined that "view" is selected (YES at step 1104), the process goes to step 1105, wherein it is determined whether or not the client application of the document management system (DMS) is installed in the activated PC. When installed (YES at step 1105), the process goes to step 1107, wherein it is determined whether or not the client application of the document management system is already activated.

When it is determined that the client application of the document management system is already activated (YES at step 1107), the process goes to step 1108. When it is determined that the client application of the document management system is not yet activated (NO at step 1107), the activation processing of the DMS is executed at step 1109 and thereafter, the process goes to step 1108. At step 1108, the connection processing to the cabinet (database) of the cabinet name stored in the area 600 shown in FIG. 6 is executed through the client application.

At next step 1110, determination on the connection processing to the cabinet is made. When it is determined that the connection processing is not executed (NO at step 1110), the process returns to step 1108, and when it is determined that the connection processing is executed (YES at step 1110), the process goes to step 1111.

At step 1111, the view processing of the document is executed in the client application. That is, the search is made by the document name 603 in the path stored in the area 601, and the document is viewed using the user interface of the DMS client 200. Finally at step 1116 the release processing of the memory or the like is executed to terminate the process.

Steps 1107 to step 1111 as described above show an example where at the DMS client 12 in which the client application of the document management system is installed, the external batch file 700 is activated and operated.

On the other hand, in a case where it is determined that the client application of the document management system (DMS) is not installed (NO at step 1105), the process order from steps 1112 to 1115 is executed to operate the external batch file for activation.

That is, since the client software is not installed in the client PC, an attempt on the connection to the DMS server 10 is made with HTTP connection of Web. It should be noted that here, a case of the HTTP connection is explained, but the download processing by FTP connection may be executed.

At step 1112, the URL information stored in 602 (FIG. 6) is obtained. At step 1113, the batch file execution program 610 makes an attempt on the connection to the DMS server 10 according to the URL information.

At step 1114, the determination processing of the connection is executed. In a case where the connection to the DMS server 10 can not be made (NO at step 1114), the process goes to step 1116, wherein the processing is cancelled. In a case where the connection to the DMS server 10 is made (YES at step 1114), the process goes to step 1115, wherein the view processing of the document is executed. More specifically, the document of the indicated URL is obtained, which will be viewed with the user interface such as Web browser. After the view processing is executed, the end processing is executed (step 1116).

As a result of the above processing, in a case where the external batch file 700 in FIG. 7 is activated, the operation is selected from the operation information stored in the batch file, and the DMS client application is installed, the operation selected based upon the information stored in the batch file can be performed.

In addition, according to the present embodiment, when the client software is not installed, the known technology such as Web browser is used to be capable of performing the operation to the target document by HTTP connection.

As described above, according to the first embodiment, registration and execution of a menu pursuant to a rule can be facilitated using the template file. In addition, when a user registers a menu of the customized name, the desired processing can be executed by a menu name easily understandable by the user.

In addition, since a menu can be outputted as a batch file equipped with an independently executable batch function, even if the application is not activated before the operation, it is possible to perform a desired operation by activating the application with the batch file.

In addition, it is determined whether or not a content of the processing is pursuant to a rule of the document management system. When the processing content is not appropriate, the registration processing is cancelled, so that a user can customize the processing content, but register only the processing pursuant to the rule. In consequence, the working rule can be kept.

In addition even if an application is not installed in a PC, the PC can have access to a desired document by using a Web application according to URL stored in the batch file. Therefore, the batch file has an advantage that the PC for execution is not required to be specified.

As a result, it is possible to use the document management system which is easily used for a user and is pursuant to the working rule, providing an advantage that an operation of a predetermined standard job such as "refer to a schedule table" can be performed without caring for a location or a document name.

In the aforementioned embodiment, the computer executes the computer program (document management server application and the document management client application) in the document management system to execute the above processing, but the execution of the processing is not limited to the computer.

For example, a part or all of the processing may be constructed of hardware such as an electronic circuit.

In addition, in a case where the present invention is carried out by a computer program, the program (program corresponding to the flow chart in the embodiment) is supplied to the system or the device directly or from a distant location. The computer of the system or the device reads out and executes the supplied program code to carry out the present invention. In methods of supplying the computer program, various computer-readable storage media such as a magnetic disc, an optical disc, an optical magnetic disc, and a semiconductor memory may be used. Besides, in regard to the supply method of the program, the program may be supplied by the downloading from the Internet to a storage medium such as a semiconductor. That is, the program may be supplied by the downloading of the computer program of the present invention itself or the compressed file containing the automatic installation function from the internet. That is, the present invention includes a server by which the program file for executing the functional processing of the present invention by a computer can be downloaded to a plurality of users.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present application claims the benefit of Japanese Patent Application No. 2008-070166, filed Mar. 18, 2008, which is hereby incorporated by reference herein in its entirety.

What is claimed is:

1. A client device connected to a document management server via a network, wherein the document management server manages a document stored in storage and maintains at least one document managing rule, the client device comprising:

an opening component configured to open a template distributed from the document management server, wherein the distributed template has been produced in the document management server based upon instructions from a manager of the document management server, and wherein the template includes information relating to an operation to be performed on a document, information relating to a name of a menu to be registered in the client device, and an identifier for specifying a document managing rule, wherein the identifier of the document managing rule included in the template is in a non-rewritable state;

an editing component configured to edit the information relating to the operation and the information relating to the name of the menu included in the opened template by a user of the client device, wherein the editing component cannot edit the identifier of the document managing rule included in the opened template;

an obtainment component configured to obtain, from the document management server, a document managing rule specified by the identifier which is included in the edited template;

a determination component configured to determine whether or not the edited information relating to the operation and the edited information relating to the name of the menu included in the edited template are pursuant to the obtained document managing rule; and a registration component configured to register, to the menu of the client device, the edited information relating to the operation included in the edited template and the edited information relating to the name of the menu included in the edited template if it is determined by the determination component that the edited information relating to the operation and the edited information relating to the name of the menu included in the edited template are pursuant to the obtained document managing rule, wherein the registration component does not register the edited information relating to the operation included in the edited template and the edited information relating to the name of the menu included in the edited template to the menu of the client device if it is determined by the determination component that the edited information relating to the operation and the edited information relating to the name of the menu are not pursuant to the obtained document managing rule.

2. The device according to claim 1, wherein the edited information relating to the name of a menu includes an object name showing a processing target, wherein the registration component combines operation content of the menu to the document with the object name to produce the name of the menu to be registered.

3. The device according to claim 1, further comprising an export component configured to produce and export a batch file based upon the menu registered by the registration component, wherein the batch file is an execution file for executing operation content of the menu.

4. The device according to claim 1, wherein the template further includes index information, which is applied to a target document for an operation when the menu registered by the registration component is selected.

5. The device according to claim 1, wherein the document managing rule established when the template is created is stored in a rule storage of the document management server related to the identifier of the document managing rule.

6. A method of managing a document in a client device connected to a document management server via a network, wherein the document management server manages a document stored in storage and keeps at least one document managing rule, the method comprising:

opening a template distributed from the document management server, wherein the distributed template has been produced in the document management server based upon instructions from a manager of the document management server, and wherein the template includes information relating to an operation to be performed on a document, information relating to a name of a menu to be registered in the client device, and an identifier for specifying a document managing rule, wherein the identifier of the document managing rule included in the template is in a non-rewritable state;

editing the information relating to the operation and the information relating to the name of the menu included in the opened template by a user of the client device, wherein the identifier of the document managing rule included in the opened template cannot be edited in the editing step;

obtaining, from the document management server, a document managing rule specified by the identifier which is included in the edited template;

determining whether or not the edited information relating to the operation and the edited information relating to the name of the menu included in the edited template are pursuant to the obtained document managing rule; and registering, to the menu of the client device, the edited information relating to the operation included in the edited template and the edited information relating to the name of a menu included in the edited template if it is determined that the edited information relating to the operation and the edited information relating to the name of the menu included in the edited template are pursuant to the obtained document managing rule, wherein the edited information relating to the operation and the edited information relating to the name of the menu are not registered to the menu of the client device if it is determined that the edited information relating to the operation and the edited information relating to the name of the menu are not pursuant to the obtained document managing rule.

7. A non-transitory computer readable storage medium containing computer-executable instructions that control a client computer which is connected to a document management server via a network, wherein the document management server manages a document stored in storage and maintains at least one document managing rule, the medium comprising:

computer-executable instructions for opening a template distributed from the document management server, wherein the distributed template has been produced in the document management server based upon instructions from a manager of the document management server, and wherein the template includes information relating to an operation to be performed on a document, information relating to a name of a menu to be registered in the client computer, and an identifier for specifying a document managing rule, wherein the identifier of the document managing rule included in the template is in a non-rewritable state;

computer-executable instructions for editing the information relating to the operation and the information relating to the name of the menu included in the opened template by a user of the client computer, wherein the identifier of the document managing rule included in the opened template cannot be edited;

computer-executable instructions for obtaining, from the document management server, a document managing rule specified by the identifier which is included in the edited template;

computer-executable instructions for determining whether or not the edited information relating to the operation and the edited information relating to the name of the menu included in the edited template are pursuant to the document managing rule; and computer-executable instructions for registering, to the menu of the client computer, the edited information relating to the operation included in the edited template and the edited information relating to the name of a menu included in the edited template if it is determined that the edited information relating to the operation and the edited information relating to the name of the menu included in the edited template are pursuant to the obtained document managing rule, wherein the edited information relating to the operation and the edited information relating to the name of the menu are not registered to the menu of the client computer if it is determined that the edited information relating to the operation and the edited information relating to the name of the menu are not pursuant to the obtained document managing rule.

* * * * *